United States Patent
Weerasinghe

(10) Patent No.: US 10,659,831 B2
(45) Date of Patent: *May 19, 2020

(54) APPARATUS AND METHOD FOR PRESENTATION OF HOLOGRAPHIC CONTENT

(71) Applicant: AT&T Intellectual Property I, L.P., Atlanta, GA (US)

(72) Inventor: Srilal Weerasinghe, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,723

(22) Filed: Aug. 22, 2018

(65) Prior Publication Data
US 2018/0367833 A1    Dec. 20, 2018

Related U.S. Application Data

(63) Continuation of application No. 13/606,699, filed on Sep. 7, 2012, now Pat. No. 10,080,049.

(51) Int. Cl.
| | |
|---|---|
| *H04N 21/262* | (2011.01) |
| *H04N 21/6547* | (2011.01) |
| *H04N 21/81* | (2011.01) |
| *H04N 21/482* | (2011.01) |

(52) U.S. Cl.
CPC ..... *H04N 21/26258* (2013.01); *H04N 21/482* (2013.01); *H04N 21/6547* (2013.01); *H04N 21/816* (2013.01)

(58) Field of Classification Search
None
See application file for complete search history.

(56) References Cited

U.S. PATENT DOCUMENTS

| | | |
|---|---|---|
| 4,408,277 A | 10/1983 | Cortellini et al. |
| 5,767,993 A | 6/1998 | Burney |
| 6,639,631 B1 | 10/2003 | Hall et al. |
| 7,653,248 B1 | 1/2010 | Witzgall et al. |
| 7,881,901 B2 | 2/2011 | Fein et al. |
| 7,916,958 B2 | 3/2011 | Witzgall et al. |
| 8,477,098 B2 | 7/2013 | Fein et al. |
| 2002/0008887 A1 | 1/2002 | Horikoshi et al. |
| 2004/0021917 A1 | 2/2004 | Plesniak et al. |
| 2005/0074119 A1 | 4/2005 | Dziekan et al. |
| 2006/0139710 A1 | 6/2006 | Schwerdtner et al. |
| 2006/0139711 A1 | 6/2006 | Leister et al. |
| 2006/0187297 A1 | 8/2006 | Onural |
| 2007/0064199 A1 | 3/2007 | Schindler et al. |

(Continued)

*Primary Examiner* — Rebecca A Volentine
(74) *Attorney, Agent, or Firm* — Guntin & Gust, PLC; Douglas Schnabel

(57) ABSTRACT

A method that incorporates teachings of the subject disclosure may include, for example, receiving, by a system comprising a processor, holographic video data and a descriptor file associated with the holographic video data, where the holographic video data comprises encoded holographic wave front images that are generated by reconstructing holographic interference patterns associated with a target object, determining, by the system, presentation characteristics from the received descriptor file, and presenting, by the system, holographic video content decoded from the holographic video data, at a portion of a display device. Other embodiments are disclosed.

20 Claims, 6 Drawing Sheets

(56) References Cited

U.S. PATENT DOCUMENTS

| | | |
|---|---|---|
| 2009/0113348 A1* | 4/2009 | Fein .................... G06F 3/04815 |
| | | 715/848 |
| 2009/0213443 A1 | 8/2009 | Kang et al. |
| 2010/0073744 A1 | 3/2010 | Zschau et al. |
| 2010/0103485 A1 | 4/2010 | Haussler et al. |
| 2010/0118117 A1 | 5/2010 | Kroll et al. |
| 2010/0149610 A1 | 6/2010 | Schwerdtner et al. |
| 2010/0262995 A1* | 10/2010 | Woods .................... G06T 15/20 |
| | | 725/40 |
| 2011/0164032 A1 | 7/2011 | Shadmi et al. |
| 2011/0228365 A1 | 9/2011 | Tsang et al. |
| 2012/0050460 A1 | 3/2012 | Tsang et al. |
| 2012/0090005 A1 | 4/2012 | Marlow et al. |
| 2012/0147134 A1 | 6/2012 | Shin et al. |
| 2013/0148179 A1 | 6/2013 | Fridental et al. |

\* cited by examiner

APPARATUS AND METHOD FOR PRESENTATION OF HOLOGRAPHIC CONTENT

CROSS-REFERENCE TO RELATED APPLICATION(S)

This application is a continuation of and claims priority to U.S. application Ser. No. 13/606,699 filed Sep. 7, 2012. The contents of the foregoing is hereby incorporated by reference into this application as if set forth herein in full.

FIELD OF THE DISCLOSURE

The subject disclosure relates generally to holographic images and more specifically to an apparatus and method for presentation of holographic content.

BACKGROUND

Media content is typically experienced by consumers via devices such as computers, televisions, radios, and mobile electronics. Media content is frequently delivered by service providers, who send the content, such as television, radio, and video programming, to consumers for enjoyment at their physical locations. Modern communication networks benefit from interconnectivity between consumers and various communication devices. Consumers typically experience media content via a display or presentation device. As network capabilities expand, these interconnections provide new opportunities to enhance the ability for consumers to enjoy media content by experiencing a variety of content over multiple devices. Holography offers consumers a new means of enjoying content. The delivery of holographic images and video to consumers presents service providers and other media participants with a means of capturing new consumers.

BRIEF DESCRIPTION OF THE DRAWINGS

Reference will now be made to the accompanying drawings, which are not necessarily drawn to scale, and wherein.

DETAILED DESCRIPTION

Figure 1:
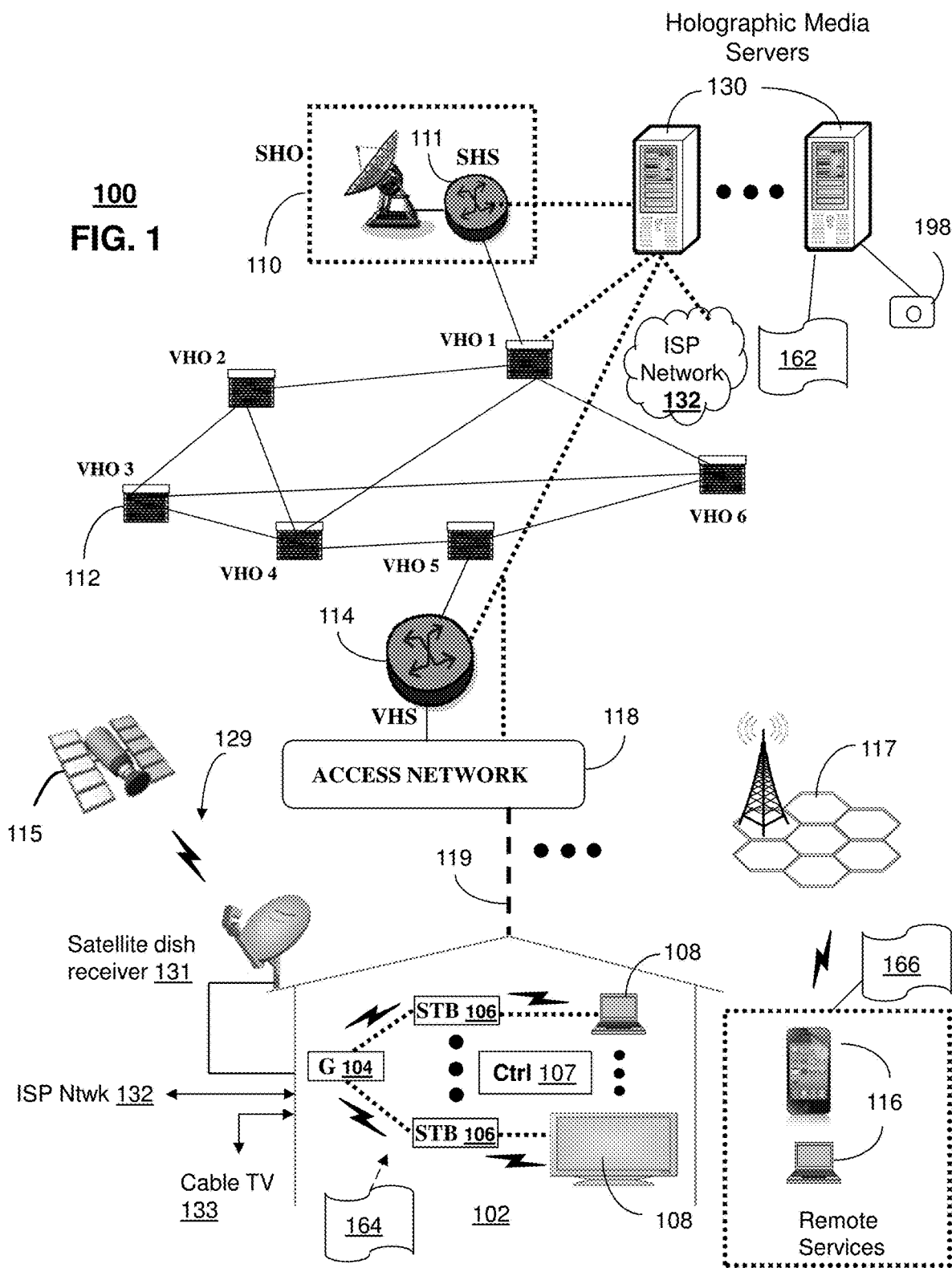
FIGS. 1-2 depict illustrative embodiments of communication systems that provide holographic content to media devices.

The subject disclosure describes, among other things, illustrative embodiments of an apparatus and method for presentation of holographic video content, where holographic video data can be received from a service provider and presented at a display device, such as a television, according to a descriptor file. The presentation of the holographic video data can be enabled or disabled according to notifications sent by the service provider.

In one or more embodiments, the holographic content can be limited in size to a particular portion of the display screen. The size limitations can be based on a number of factors, including the capabilities of the user equipment, bandwidth limits associated with the user's local network, and so forth. In one embodiment, digital holographic interference data can be subjected to a digital Fourier transformation that generates a wave front representing the holographic image of a target object. This reconstructed wave front can be encoded into a stream of video data representing the holographic image. Other embodiments are included in the subject disclosure.

One embodiment of the subject disclosure includes a memory storing computer instructions and a processor coupled to the memory. The processor can perform operations responsive to executing the computer instructions including receiving holographic video data from the service provider network. The holographic video data can encode holographic wave front images that can be generated by reconstructing holographic interference patterns associated with one or more target objects. The processor can also perform operations for receiving a descriptor file associated with holographic video data from the service provider network and for determining presentation characteristics from the received descriptor file. The processor can further perform operations for decoding the holographic video data according to the determined presentation characteristics to generate holographic video content. The processor can perform operations for receiving a first notification from the service provider network to enable holography display and, in turn, for presenting the holographic video content at a portion of the display device responsive to receiving the first notification.

One embodiment of the subject disclosure includes non-transitory computer-readable storage medium including computer instructions, which, responsive to being executed by at least one processor, can cause the at least one processor to perform operations including receiving holographic video data from a service provider network. The holographic video data can include encoded holographic wave front images that can be generated by reconstructing holographic interference patterns associated with one or more target objects. The computer instruction can further include receiving a descriptor file associated with holographic video data from the service provider network. The computer instructions can, in turn, determine presentation characteristics from the received descriptor file. The computer instructions can include decoding the holographic video data according to the determined presentation characteristics to generated holographic video content and presenting the holographic video content at a portion of a display device.

One embodiment of the subject disclosure includes a method including receiving, by a system comprising a processor, holographic video data and a descriptor file associated with the holographic video data from a service provider network. The holographic video data can include holographic wave front images that can be generated by reconstructing holographic interference patterns associated with one or more target objects. The method can include determining, by the system, presentation characteristics from the received descriptor file and presenting, by the system, holographic video content decoded from the holographic video data, at a portion of a display device.

FIG. 1 depicts an illustrative embodiment of a first communication system 100 for delivering media content. The system 100 can allow for delivery of media content, such as a streaming video application service including Internet Protocol Television (IPTV) or Video-on-Demand (VoD). As will be described in more detail below, the system 100 further can allow for delivery of holographic content data to consumer devices, such as media processor devices 106 and mobile communication devices 116. The system 100 can further provide computational services to prepare raw holographic content information for use by consumer devices, thereby reducing computational requirements at the consumer devices. In one embodiment, system 100 can enable and/or disable presentation of the holographic content at the consumer devices and/or can adapt or otherwise adjust the presentation of the holographic content to account for characteristics of the media device 108 or other display system. In another embodiment, the holographic content can be associated with the video content being presented at the display device, such as providing a holographic image of a diamond ring when the video content is related to a couple that has become engaged. In this example, the holographic content can be an enlarged image of the diamond ring being worn in the video content.

The system 100 can include a super head-end office (SHO) 110 with at least one super head-end office server (SHS) 111 which receives media content from satellite and/or terrestrial communication systems. In the present context, media content can represent, for example, audio content, moving image content such as 2D or 3D videos, video games, virtual reality content, still image content, holographic content, and combinations thereof. The SHS server 111 can forward packets associated with the media content to one or more video head-end servers (VHS) 114 via a network of video head-end offices (VHO) 112 according to a multicast communication protocol or according to a unicast protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The exemplary embodiments can utilize other components or network elements in the access network 118, such as routers and switches, to facilitate the delivery of services to end-user equipment. The gateway 104 can use communication technology to distribute broadcast signals to media processors 106 such as Set-Top Boxes (STBs) which, in turn, presents broadcast channels to media devices 108 such as computers or television sets managed in some instances by a media controller 107 (such as an infrared or RF remote controller).

The gateway 104, the media processors 106, and/or media devices 108 can utilize tethered communication technologies (such as coaxial, power line or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used in the media system of FIG. 1. The satellite broadcast television system can be overlaid, operably coupled with, or replace the IPTV system as another representative embodiment of communication system 100. In this embodiment, signals transmitted by a satellite 115 that include media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to an Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services. The exemplary embodiments can utilize or otherwise include components and/or techniques for other over-the-air and/or landline media content services system.

Some of the network elements of the IPTV media system can be coupled to one or more computing devices 130, a portion of which can operate as a web server for providing web portal services over the ISP network 132 to wire line media devices 108 or wireless communication devices 116.

Communication system 100 can also provide for all or a portion of the computing devices 130 to perform functions for providing holographic content over the communication system 100. The computing devices, hereafter referred to as media servers 130, can use computing and communication technology to perform function 162, which can include, among other things, receiving holographic content from, for example, a super head end office server 111 of the super head office 110 and delivering this holographic content to consumer devices over the communication system 100. The media servers 130 can distribute holographic content to consumer devices, such as media processor device 106 at consumer premises and/or mobile communication devices 116, such as by way of the access network 118.

The holographic content can include still images or video images of one or more target objects that have been subjected to holographic imaging. For example, holographic imaging can be performed by splitting a laser beam into an object beam and a reference beam. One or more target objects can be exposed to the object beam. Light from the object beam can be reflected, or scattered, as it interacts with the target object. This scattered light can be collected with a mirror system and then superimposed with the reference beam. The combination of the reference beam and the scattered light can form interference patterns, which can be captured by means of a photographic plate, film, or a camera sensor. In one embodiment, the interference patterns are captured by a charged coupled device (CCD) sensor array of a digital camera 198. A single captured interference pattern can create a single, raw holographic image of the target. A series of captured interference patterns can be used to reconstruct a three-dimensional holographic video image of the target.

The raw holographic interference patterns may not be meaningful to the human eye but can be used to reconstruct a three-dimensional holographic image of the original target. To reconstruct the holograph, a copy of the reference light can be diffracted onto the captured interference patterns. If the captured interference patterns are stored on a photographic plate, then the diffraction can be accomplished by physical interaction of the reference light with the plate. However, where the captured interference patterns are stored as digital data, such as would be the case for a CCD camera, the diffraction step can be simulated through the use of matrix computations performed on the digital interference pattern data. In one embodiment, the digital holographic interference data is subjected to a digital Fourier transformation that generates a wave front representing the holographic image of the target object. The reconstructed wave front can then be encoded into a stream of video data representing the holographic image, where this stream can then be sent to a user device.

The holographic content that is received at the media servers 130 can be in the form of a collection of raw, holographic interference patterns that have been captured from a holographic imaging process or can be in the form of a reconstructed hologram. In the first case, the media servers 130 can perform computational analysis on received, raw holographic data to reconstruct holographic wave front images for viewing at the consumer devices. In one embodiment, the media servers 130 can perform Fourier transformations on this raw holographic data. By performing the holographic reconstruction computations at the media servers 130, or upon other computer devices designated by the media servers 130, rather than at the user device, computational requirements for consumer devices can be reduced. In the second case, the media servers 130 can receive the holographic content in a reconstructed form and/or can maintain a database of reconstructed holographic video data for subsequent access. In yet another embodiment, the holographic content can be in the form of a computer generated hologram that is based on one or more virtual target objects.

The media servers 130 can deliver the holographic content to consumer devices. In one embodiment, the media servers 130 can deliver the holographic content upon a request from a consumer device. For example, a media processor device 106 can enter a mode for searching out holographic content available at the system 100. The media processor device 106 can send a request to a media server 130 for holographic content that is generally available and/or available according to a subscription plan. The media server 130 can respond with a listing of available holographic content, which can be selected at the media processor device 106. In another embodiment, the media server 130 can select and offer a particular specimen or video of holographic content to the media processor device 106. In one embodiment, a media server 130 can automatically provide holographic content to a consumer device and allow the consumer device to decide, with or without user intervention, whether to present the holographic content.

In one embodiment, the media server 130 can control presentation of holographic content that is sent to the consumer devices. In one embodiment, presentation of the holographic content is made conditional upon the reception, at the consumer device, of a notification that enables the presentation. For example, a holographic image can be sent from a media server 130 to a mobile communication device 116 for presentation at a display of the device 116. However, the mobile communication device 116 can be required to wait for a notification from the media server 130, or another system device designated by the media server 130, before being permitted to present the holographic image. In another embodiment, the presentation of the holographic image can be disabled at the consumer device by a notification. In one embodiment, the notification can be a cue tone that is sent to the consumer device over a media channel. In other embodiments, the notification can be a message, a key, and/or the holographic data itself.

In one embodiment, the media server 130 can transmit the holographic content data over a media programming channel, such as a television channel, a data stream channel, an Internet Protocol television channel, or website. In one or more embodiments, the holographic content can accompany non-holographic media content on a common channel. For example, a broadcast of the ESPN™ sports channel can include both programming content and content necessary to support a holographic display. In this example, the holographic display can be a holographic image of the ESPN™ logo. In one embodiment, the programming and holographic content can be included in a common data stream with the sports programming. In another embodiment, the holographic content can be sent in a separate data stream or can be sent in a data file whose transmission is separated in time from a data stream carrying the sports programming content. In another embodiment, the holographic content can be sent as a series of blocks or portions that carry a single holographic image. The consumer device can collect the portions and then recreate the single holographic image by concatenating the images during encoding.

In one embodiment, the media server 130 can transmit the holographic content on a media channel that is separate from the programming content channel. For example, the ESPN™ logo holographic display data can be transmitted on a channel that is dedicated to the transmission of holographic content data. In one embodiment, all of the available holographic content for the system 100 can be periodically broadcast over a holographic channel so that consumer devices could access particular holographic content data sets as a background task, such as when the consumer device is not in use. In another embodiment, the holographic content for a particular programming network, or a group of networks, can be combined and made available on a holographic content channel.

In another embodiment, the media server 130 can deliver a descriptor file for the holographic content data. The descriptor file can provide information to assist the consumer device in decoding and presenting the holographic image from the received holographic content data. For example, the descriptor file can include information on data compression, minimum display requirements, whether the holographic image is enabled or disabled via a cue tone, size of image, and/or periodic time of image.

In addition to holographic images and video, the communication system 100 can offer multiple forms of other media services to media devices by way, for example, wireless access base stations 117. These wireless access base stations 117 can operate according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can by supported by the system 100.

Figure 2:
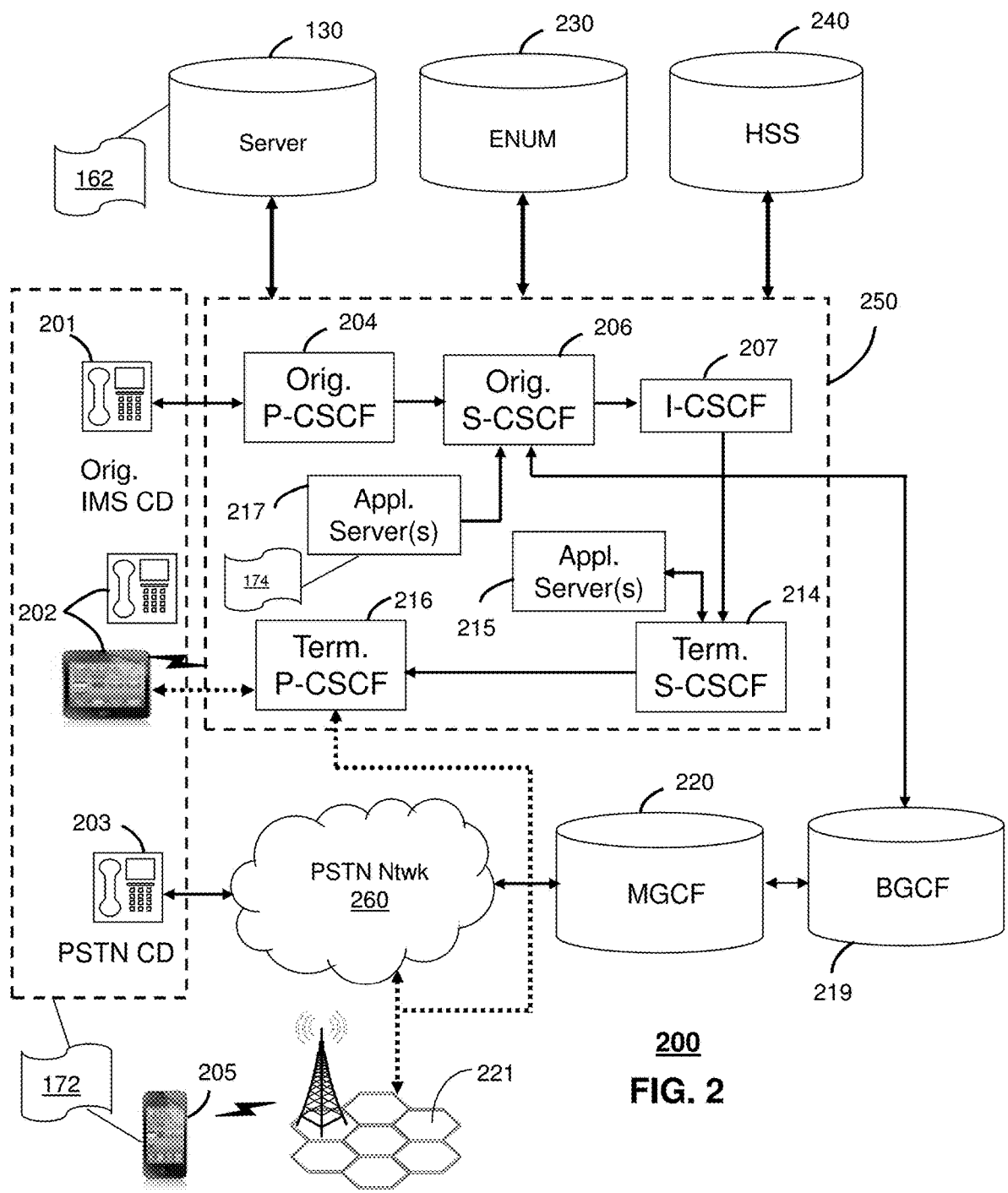

FIG. 2 depicts an illustrative embodiment of a communication system 200 employing Internet Protocol Multimedia Subsystem (IMS) network architecture to facilitate combining the services of circuit-switched systems and packet-switched systems. The system 200 can allows a media server 130 to provide holographic content data to a mobile communication device 205 over the IMS network in general and a cellular network 221 in particular. The system 200 further can be used by the media server 130 to control presentation of delivered holographic content by enabling or disabling content presentation at mobile communication devices 205. Alternatively, a mobile communication device 205 can request holographic content through the IMS network 250.

In one embodiment, the communication system 200 can comprise a Home Subscriber Server (HSS) 240, a tElephone NUmber Mapping (ENUM) server 230, and other network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (Aas) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wire line or wireless devices. For example, the CDs of FIG. 2 can be communicatively coupled to a cellular base station 221, a femtocell, a WiFi router, a Digital Enhanced Cordless Telecommunications (DECT) base unit, or another suitable wireless access unit to establish communications with the IMS network 250 of FIG. 2. The cellular access base station 221 can operate according to common wireless access protocols such as GSM, CDMA, TDMA, UMTS, WiMax, SDR, LTE, and so on. Other wireless network technologies can be supported by the communication system 200. Accordingly, multiple wire line and wireless communication technologies are supported for the CDs of FIG. 2.

Cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 130 of FIG. 1 can be operably coupled to the second communication system 200 for purposes similar to those described above. The media server 130 can perform function 162 and thereby provide holographic content to the CDs 201, 202, 203 and 205 of FIG. 2. CDs 201, 202, 203 and 205, which can be adapted with software to perform function 172 to utilize the holographic content of the media server 130. The media server 130 can be an integral part of the application server(s) 217 performing function 174, which can be substantially similar to function 162 and adapted to the operations of the IMS network 250.

Figure 3:
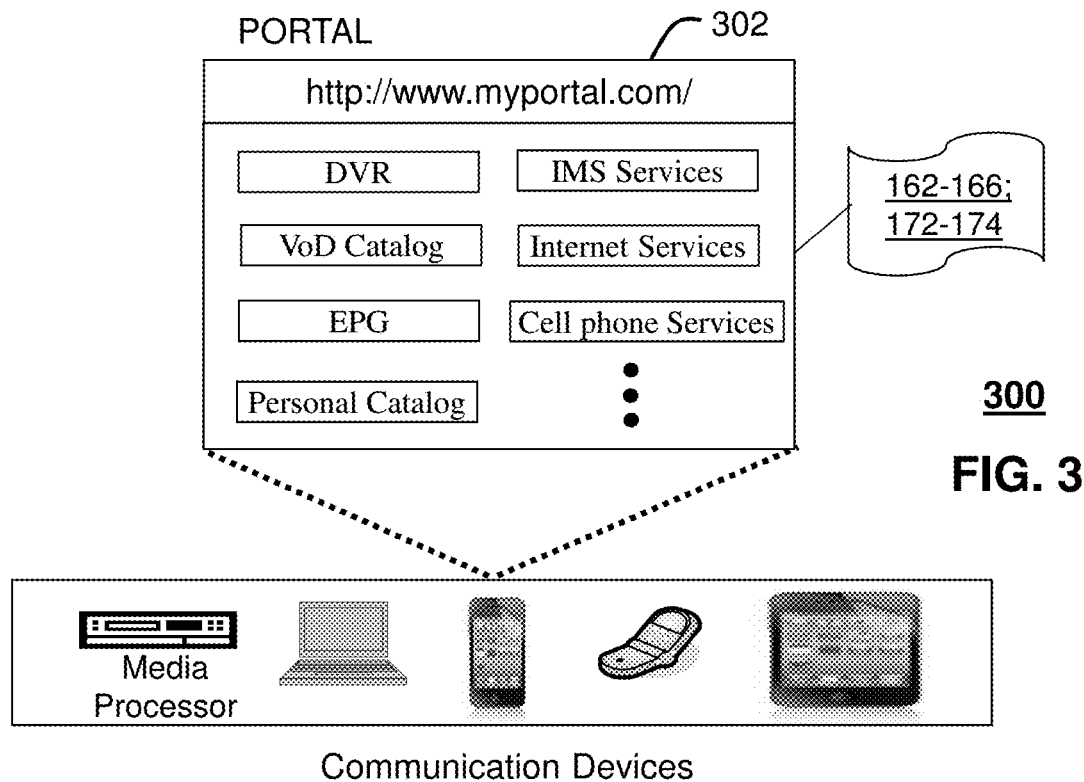
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The portal system 300 allows for interaction with communication systems, such as those systems 100, 200 illustrated in FIGS. 1 and 2. Such controlled interaction can include receiving requests from a mobile device over a cellular network for delivery of holographic data. For example, a subscriber of a mobile communication device 116 or of a media processor device 106 can log onto a web portal 302, view listings and/or examples of available holographic content, and request holographic content. As described herein, the systems 100, 200 allow for a media server 130 to deliver holographic content data to a consumer device and to control the presentation of the holographic content at the device by enabling or disabling the presentation. The portal 302 can be also be used, for example, to control parameters related to implementation of such features. Such parameters can include user preferences, such as restrictions on offloading, registration of wireless access points, preferences for determining a location of the mobile device, and the like.

The web portal 302 can be used for managing services of communication systems 100-200. A web page of the web portal 302 can be accessed by a Uniform Resource Locator (URL) with an Internet browser using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

The web portal 302 can further be utilized to manage and provision software applications 162-166, and 172-174, such as transmitting and/or receiving streamed media content, and to adapt these applications as may be desired by subscribers and service providers of communication systems 100-200.

Figure 4:
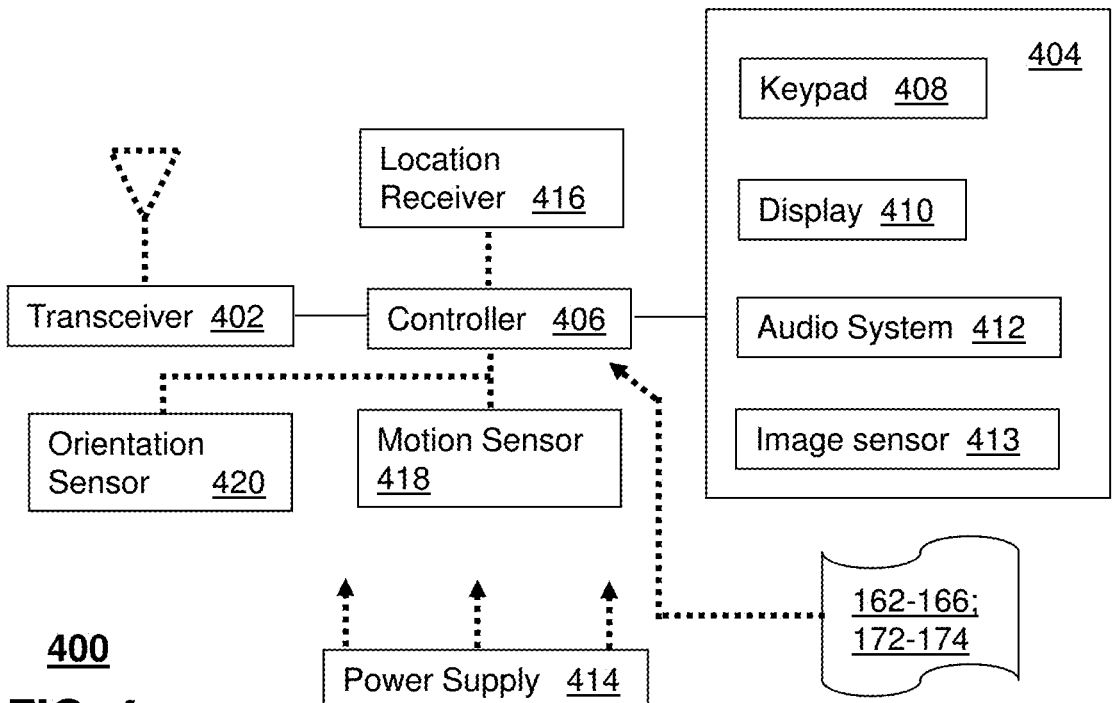
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wire line and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wire line access technologies (such as PSTN), packet-switched wire line access technologies (such as TCP/IP, VoIP, etc.), and combinations thereof.

In at least some embodiments the display 410 can include three-dimensional capability with high-definition television pixel resolution. In one embodiment, the display 410 can predominately be a two-dimensional display but include an inset area capable of supporting the display of three-dimensional holographic content. For example, a 40-inch, two-dimensional capable display screen could include a 3-inch by 3-inch inset area for the display of the holographic content. Even though the embedded holographic image would be small when compared to the total display, the size of the holographic image would be substantial enough to be attractive to consumers. The holographic inset can be useful for the display of many types of holographic content, such as network logos, local station call letters, consumer products, and/or personal holographic images appearing on social network sites.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wire line interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a CCD camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400

(North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components, not shown in FIG. 4 can be included in the communication device 400. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other devices that can operate in communication systems 100-200 of FIGS. 1-2 such as a gaming console and a media player. The communication device 400 shown in FIG. 4 or portions thereof can serve as a representation of one or more of the devices of communication systems 100-200. The controller 406 can be adapted in various embodiments to perform the functions 162-166 and 172-174, such as transmitting and/or receiving streamed media content.

Figure 5:
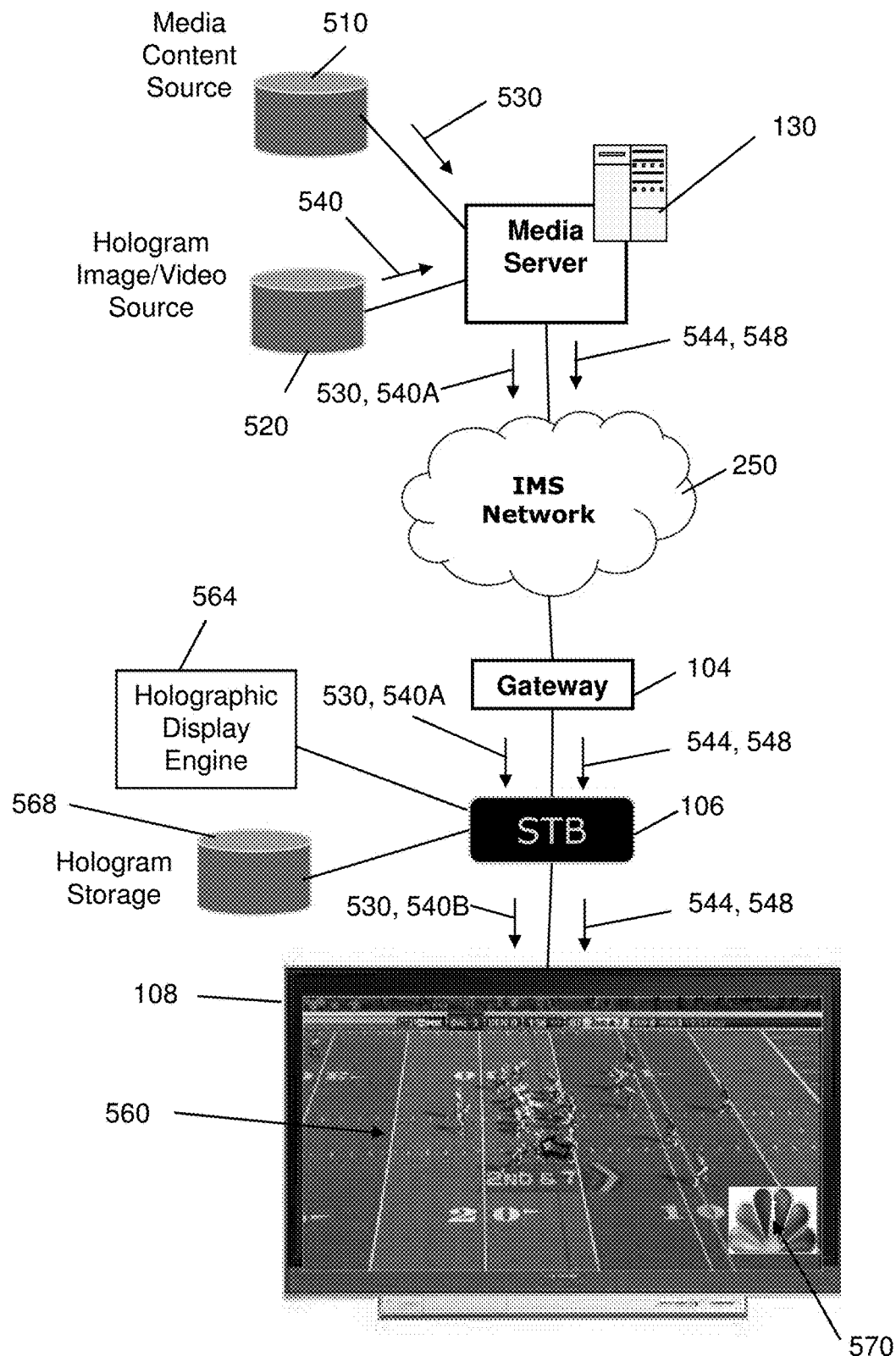
FIG. 5 depicts an illustrative embodiment of a system for providing holographic content at media devices.

FIG. 5 depicts an illustrative embodiment of a communication system 500 for providing holographic content for presentation by one or more media devices. System 500 can be overlaid or operably coupled to communication systems 100-200 as another representative embodiment of communication systems 100-200. System 500 can include a media server 130 in communication with a packet switched network, such as IMS network 250. The media server 130 can be in communication with a media processor 106, through a gateway device 104. The media processor 106, such as a set-top box, can further be in communication with a media device 108. The media device 108 can be a television, a display panel, a computer device, a mobile communication device, a projection display devices, and/or a combination of such devices. The media server 130 can provide media content by way of media content streams to the media processor device 106.

In one embodiment, the media server 130 can receive programming media content data 530 from a media content source 510 and holographic content data 540 from a hologram image/video source 520. In another embodiment, the holographic content 540 can be included in the programming media content 530. In one embodiment, the holographic content 540 can be received at the media server 130 as a collection of raw, holographic interference patterns that have been captured from a holographic imaging process. The media server 130 can then perform computational analysis on the raw holographic data to reconstruct holographic wave front images for viewing at the consumer devices. The reconstructed holographic content is herein called, simply holographic video data 540A. In one embodiment, the media server 130 can perform Fourier transformations on the raw holographic data. By performing the holographic reconstruction computations at the media server 130, or upon other computer devices (e.g., service provider equipment) designated by the media servers 130, computational requirements for the consumer devices are reduced. In another embodiment, the media server 130 can receive the holographic content as holographic video data 540A from the hologram source 520 or the media server 130 can maintain a database of holographic video data 540A for subsequent access.

The media server 130 can deliver the media content data 530 and the holographic video data 540 to media processor device 106. In one embodiment, the media server 130 can deliver the holographic video data 540 upon a request from a consumer device. For example, the media processor device 106 can enter a mode for searching out holographic content available on the system 500. The media processor device 106 can send a request to a media server 130 for holographic content that is generally available and/or available according to a subscription plan. The media server 130 can respond with a listing of available holographic content, which can be selected at the media processor device 106. In another embodiment, the media server 130 can select and offer a particular specimen or video of holographic video data 540 to the media processor device 106. In one embodiment, a media server 130 can automatically provide holographic video data 540 to the media processor device 106 and allow the media processor device 106 to decide, with or without user intervention, whether to present the holographic video data 540.

In one embodiment, the media server 130 can control presentation of holographic video data 540 that is sent to the media processor device 106. In one embodiment, presentation of the holographic video data 540 can be made conditional upon the reception, at the media processor device 106, of an enabling notification 544 that enables the presentation. For example, a holographic image can be sent from a media server 130 to the media processor device 106 for presentation at a media device 108 coupled to the media processor device 106. In another embodiment, the media processor device 106 can be required to wait for the enabling notification 544 from the media server 130, or another system device designated by the media server 130, before presenting the holographic image. In another embodiment, the presentation of the holographic image can be disabled at the media processor device 106 by a disabling notification 548. In one embodiment, the notifications 544 and 548 can be cue tones that are sent to the media processor device 106 over a media channel.

In one embodiment, the media server 130 can transmit the holographic video data 540A over a media programming channel, such as a television channel or a data stream channel or an Internet Protocol television channel or website. In one or more embodiments, the holographic content can accompany the media content data 530 on a common channel. For example, a broadcast of a network channel can include both programming content, such as a football game 560, and content necessary to support a holographic display, such as a holographic logo 570 for the programming network. In one embodiment, the programming media content data 530 and holographic video data 540A can be included in the same data stream. In another embodiment, the holographic video data 540A can be sent in a separate data stream or a data file that is separated in time from a data stream carrying the media content data 530. In another embodiment, the holographic video data 540A can be sent as a series of portions of a single holographic image. The media processor device 106 can collect the portions and then recreate the single holographic image.

In one embodiment, the media server 130 can transmit the holographic video data 540A on a media channel that is separate from the programming content channel. For example, holographic video data 540A for the network logo 570 could be transmitted on a channel that is dedicated to the transmission of holographic content. In one embodiment, all of the available holographic video data 540A for the system 100 can be periodically broadcast over a holographic channel so that the media processor device 106 can access particular holographic content data 540A as a background task, such as when the media processor device 106 is not in use. In another embodiment, the holographic video data 540A for a particular programming network, or a group of networks, can be combined and made available on a holographic content channel, such as a dedicated channel.

In another embodiment, the media server 130 can deliver a descriptor file 544 for the holographic video data 540A. The descriptor file 544 can provide information to the media processor device 106 information to allow the holographic display engine 564 of the media processor device 106 to decode the holographic video data 540A and to present a holographic image from the decoded holographic data. For example, the descriptor file 544 can include information on data compression (e.g., MPEG), minimum display requirements, whether the holographic image is enabled or disabled via a cue tone, size of image, and/or a time period for any repeated motion for a holographic image. The media processor device 106 can decode the received holographic data using, for example, MPEG data compression, to generate a version of decoded holographic data. The media processor device 106 can store holographic videos/images at local hologram storage 568.

In one embodiment, the size and location of the holographic display area 570 can be fixed for all viewers of the media device 108. In one embodiment, the media device 108 can send display characteristic information to the media processor device 106. The display characteristic information can include information on the size and pixel configuration of the holographic display area 570 of the media device 108. For example, the display characteristic information can include a pixel density, a pixel aspect ratio, and/or a refresh speed of the holographic display area 570.

Figure 6:
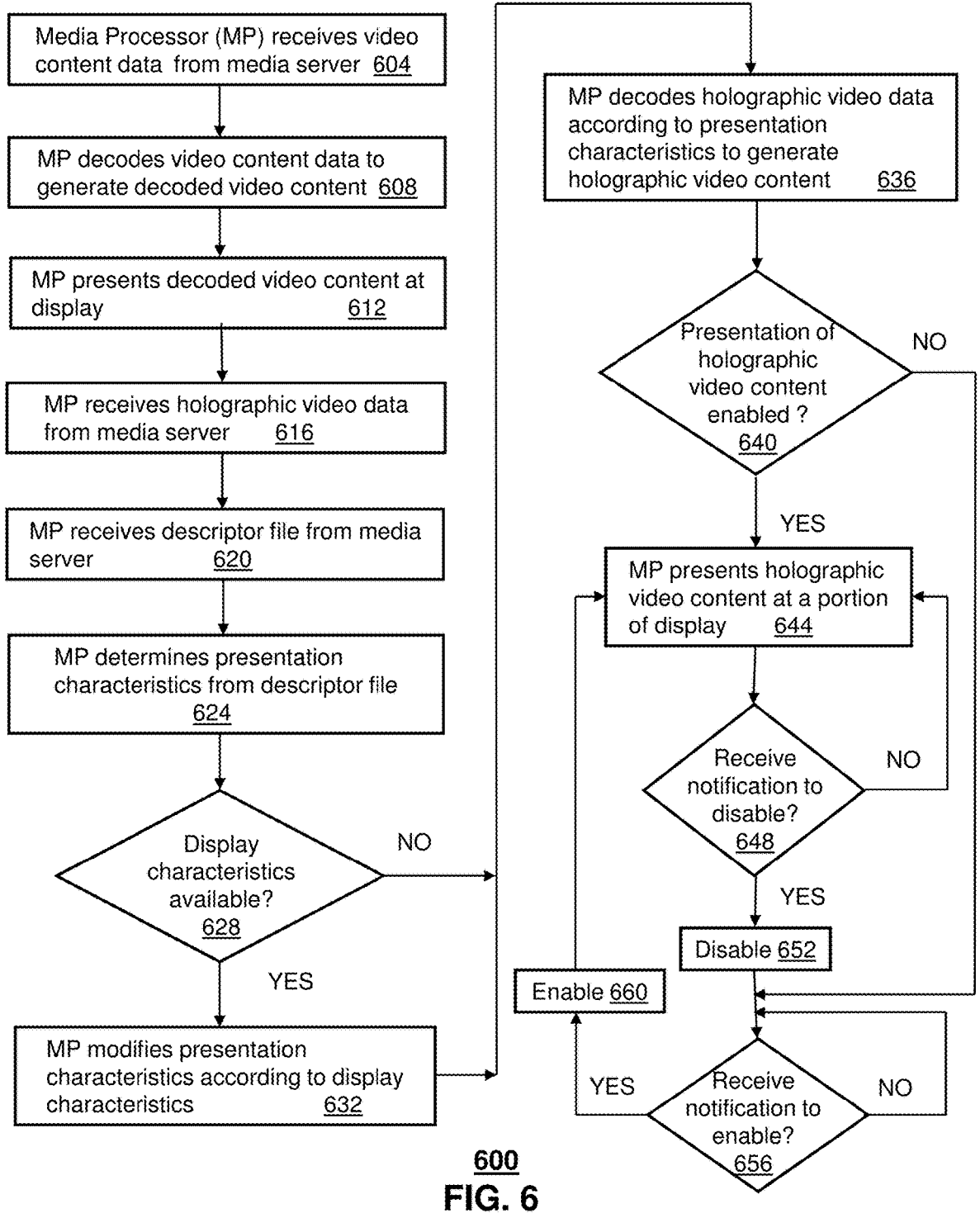
FIG. 6 depicts an illustrative embodiment of a method operating in portions of the systems described in FIGS. 1-5 for providing holographic content at media devices.

FIG. 6 depicts an illustrative method 600 that operates in portions of the devices of FIGS. 1-5. Method 600 can begin with step 604 in the media processor device 106 can receive video content data 530 from a service provider network. In one embodiment, the media server 130 can transmit video content data 530 to the media processor device 106. In step 608, the media processor device 106 can decode the video content data 530 and can present the decoded data at the media device 108 in step 612.

In step 616, the media processor device can receive holographic video data 540A from the media server 130. In one embodiment, the media server 130 can deliver the holographic video data 540 upon a request from a media processor device 106. For example, the media processor device 106 can search for holographic content available on the system 500 and/or send a request to a media server 130 for holographic content. The media server 130 can respond by listing available holographic content, which can be selected at the media processor device 106. In another embodiment, the media server 130 can select and offer a particular specimen or video of holographic video data 540 to the media processor device 106. In one embodiment, a media server 130 can automatically provide holographic video data 540 to the media processor device 106 and allow the media processor device 106 to decide, with or without user intervention, whether to present the holographic video data 540.

In step 620, the media processor device 106 can receive a descriptor file from the media server 130. The descriptor file 544 can provide information to the media processor device 106 information to allow the holographic display engine 564 of the media processor device 106 to decode the holographic video data 540A and to present a holographic image from the decoded holographic data 540A. The descriptor file 544 can include information on data compression, minimum display requirements, enabling or disabling cues, size of image, and/or any time period for a repeated motion of a holographic image. In step 624, the media processor device 106 can determine presentation characteristics from the descriptor file 544. In step 628, the media processor device 106 can determine if display characteristics are available from the media device 108. In one embodiment, the media device 108 can periodically broadcast display characteristics associated with its holographic display area 570. In another embodiment, the media device 108 can send its display characteristics upon request from the media processor device 106.

In step 632, if the display characteristics are available, then the media processor device 106 can modify the presentation characteristics according to the display characteristics. For example, the media processor device 106 can adjust the presentation characteristics in response to determining the pixel density of the display. In step 636, where the media processor device 106 can decode the holographic video data 540A according to the presentation characteristics to generate holographic video content 540B. In one embodiment, the media processor device 106 decodes a data stream of the holographic image into a sequence of video signals.

In step 640, the media processor device 106 can determine if the holographic video content is enabled for presentation at the media device 108. If presentation is enabled in step 640, then the media processor device 106 can present the holographic video content at a portion of the display of the media device 108. For example, the holographic image can be presented at a high-definition, three-dimensional area 570 of the display 108. In step 644, the media processor device 106 can determine if a notification 648 to disable the presentation of the holographic image has been received. If the notification has been received, then presentation is disabled at step 652. If the notification has not been received, then the media processor device 106 continues to present the holographic video content 540B at the holographic display area 570. In step 656, the media processor device 106 can determine if a notification 644 to enable the presentation of the holographic image has been received. If so, then the media processor device 106 can enable presentation of the holographic image at 660.

Upon reviewing the aforementioned embodiments, it would be evident to an artisan with ordinary skill in the art that said embodiments can be modified, reduced, or enhanced without departing from the scope and spirit of the claims described below. For example, the media device 108 can be coupled to the media processor device 106 by a wireless communication link. In one embodiment, the reconstruction of the holographic video data 540A can be performed at the media processor device 106. In another embodiment, the reconstruction of the holographic video data 540A can be partially performed at the media server 130 and partially performed at the media processor device 106. In this example, the amount of reconstruction performed by one or the other device can be determined dynamically, such as based on determining available resources of the devices or determining the amount of data to be reconstructed.

In another embodiment, a set of user configurations can be stored for each user of the media processor device 106 and/or each user of a remote controller 107 associated with the media processor device 106. In another embodiment, the holographic image can be computer-generated from a virtual image.

In one embodiment, the holographic image 570 that is presented at the media device 108 can be a three-dimensional control interface. For example, a three-dimensional button could be generated as a holographic image 570. The button can be selected by a user of the media processor device 106 or by a user of a mobile communication device 116.

In another embodiment, the holographic content can be an advertisement related to the video content being presented at the display device. For example, the video content can be depicting a couple walking and holding hands. The holographic content can be an advertisement for jewelry being worn in the video content. In one embodiment, the holographic advertisement content can be customized to the viewer via targeted marketing, such as selecting holographic advertisements based on preferences of a viewer, monitored behavior of the viewer, and so forth.

Figure 7:
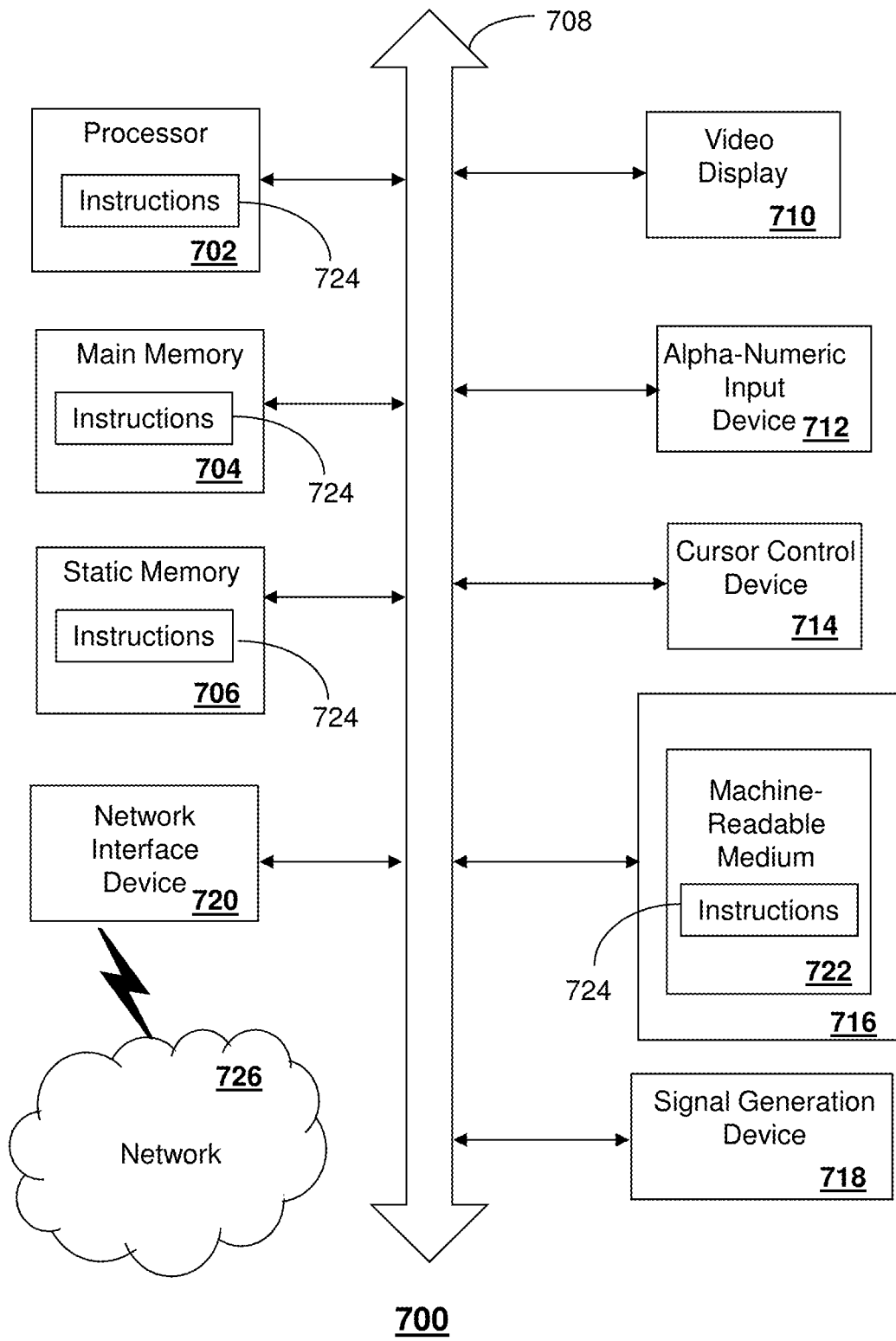
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the media server 130, the media processor 106, and/or the mobile communication device 516, and/or other devices of FIGS. 1-6. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. In one embodiment, a listing of available displays for selection at the media processor device 107 is generated based upon detection of displays in communication with the media processor device 107 or display activations.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet transmission and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by the computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   sending, to a service provider network, by a processing system including a processor, a selection associated with a listing of available holographic content;
   receiving, by the processing system, holographic video data from the service provider network according to the selection;
   obtaining, by the processing system, a pixel density associated with a first portion of a display device;
   decoding, by the processing system, the holographic video data according to the pixel density associated with the first portion of a display of the display device to generate holographic video content;
   transmitting, by the processing system, the holographic video content to the display device;
   decoding, by the processing system, non-holographic media content data to generate decoded video content; and
   transmitting, by the processing system, the decoded video content to the display device, wherein the display device simultaneously presents the holographic video content at the first portion of the display and presents the decoded video content at a second portion of the display of the display device, and wherein the first portion and the second portion of the display are part of a single display panel.

2. The method of claim 1, further comprising:
   receiving, by the processing system, a descriptor file associated with the holographic video data; and
   determining, by the processing system, presentation characteristics from the descriptor file, wherein the decoding of the holographic video data is further according to the presentation characteristics.

3. The method of claim 2, wherein the presentation characteristics include coordinates for placing the holographic video content on the first portion of the display of the display device, a resolution of the display of the display device, or any combination thereof.

4. The method of claim 2, further comprising:
   receiving, by the processing system, display characteristics from the display of the display device; and
   modifying, by the processing system, the presentation characteristics according to the display characteristics.

5. The method of claim 1, wherein the holographic video data includes encoded holographic wave front images that are generated by reconstructing holographic interference patterns associated with a target object.

6. The method of claim 5, wherein the reconstructing of the holographic interference patterns is based on determining a transmittance matrix that simulates diffracting of a reference beam onto captured holographic interference patterns.

7. The method of claim 1, wherein the holographic video data and non-holographic media content data are received in a combined data stream.

8. The method of claim 1, wherein non-holographic media content data is received via a first television channel and the holographic video data is received via a second television channel.

9. The method of claim 1, further comprising receiving, by the processing system, a first notification from the service provider network to enable holography display, wherein the transmitting of the holographic video content is responsive to receiving the first notification.

10. The method of claim 1, further comprising sending, by the processing system, a request, to a service provider network, to search for holographic content, wherein the receiving of the listing of available holographic content is responsive to the sending of the request to search for the holographic content.

11. The method of claim 1, further comprising:
    receiving, by the processing system, a wireless signal from a mobile communication device for user-activation of a three-dimensional control interface of the holographic video content presented by the display device; and
    performing, by the processing system, an operation responsive to the receiving of the wireless signal.

12. The method of claim 1, further comprising:
    receiving, by the processing system, a second notification from the service provider network to disable holography display; and
    disabling, by the processing system, the presentation of the holographic video content responsive to receiving the second notification.

13. A non-transitory computer-readable storage medium operating at a display device, comprising computer instructions, which, responsive to being executed by a processing system including a processor, cause the processing system to perform operations comprising:

transmitting, to a media processor, a pixel density associated with a first portion of a display of the display device;

receiving, from the media processor, holographic video content, wherein the media processor receives holographic video data according to a selection from a listing of available holographic content, wherein the media processor decodes the holographic video data according to the pixel density associated with the first portion of the display;

receiving, from media processor, decoded video content, wherein the media processor generates the decoded video content by decoding non-holographic media content;

presenting the holographic video content at the first portion of the display; and presenting the decoded video content at a second portion of the display of the display device, wherein the holographic video content and the decoded video content are presented simultaneously, and wherein the first portion and the second portion of the display are part of a single display panel.

14. The non-transitory computer-readable storage medium of claim 13, wherein the media processor further determines presentation characteristics from a descriptor file associated with the holographic video data, and wherein the presentation characteristics include coordinates for placing the holographic video content on the first portion of the display of the display device, resolution of the display of the display device, or any combination thereof.

15. The non-transitory computer-readable storage medium of claim 14, wherein the operations further comprise transmitting, to the media processor, display characteristics, wherein the media processor modifies the presentation characteristic according to the display characteristics.

16. The non-transitory computer-readable storage medium of claim 13, wherein the holographic video data includes a still holographic image, a plurality of moving holographic images, a commercial logo, a three-dimensional photographic image, or any combination thereof.

17. A device, comprising:
a memory storing computer instructions; and
a processing system including a processor coupled to the memory, wherein the processing system, responsive to executing the computer instructions, performs operations comprising:

receiving a listing of available holographic content from a service provider network; and sending a selection associated with the listing of available holographic content to the service provider network, wherein the receiving of the holographic content is responsive to the selection;

receiving holographic video data from a service provider network;

receiving, from a display device, a pixel density associated with a first portion of the display device;

decoding the holographic video data according to the pixel density associated with the first portion of a display of the display device to generate holographic video content;

transmitting the holographic video content to the display device; and decoding non-holographic media content data to generate decoded video content; and transmitting the decoded video content to the display device, wherein the display device simultaneously presents the holographic video content at the first portion of the display and presents the decoded video content at a second portion of the display of the display device, and wherein the first portion and the second portion of the display are part of a single display panel.

18. The device of claim 17, wherein the operations further comprise determining presentation characteristics from a descriptor file.

19. The device of claim 18, wherein the decoding of the holographic video data is further according to the presentation characteristics, wherein the presentation characteristics include coordinates for placing the holographic video content on the first portion of the display of the display device, a resolution of the display of the display device, or any combination thereof.

20. The device of claim 17, wherein the holographic video data includes encoded holographic wave front images that are generated by reconstructing holographic interference patterns associated with a target object.

* * * * *